US008139768B2

(12) United States Patent
Pritchett et al.

(10) Patent No.: US 8,139,768 B2
(45) Date of Patent: Mar. 20, 2012

(54) ENCRYPTING CONTENT IN A TUNER DEVICE AND ANALYZING CONTENT PROTECTION POLICY

(75) Inventors: Thaddeus C. Pritchett, Edmonds, WA (US); Kenneth Reneris, Remond, WA (US); Bernhard G. Kotzenberg, Bellevue, WA (US); David J. Cheng, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 1252 days.

(21) Appl. No.: 11/275,626

(22) Filed: Jan. 19, 2006

(65) Prior Publication Data
US 2007/0192810 A1 Aug. 16, 2007

(51) Int. Cl.
H04L 29/06 (2006.01)
(52) U.S. Cl. .......... 380/228; 725/90; 380/200; 380/212; 380/239; 713/189
(58) Field of Classification Search .................. 380/201, 380/239; 726/26
See application file for complete search history.

(56) References Cited

U.S. PATENT DOCUMENTS

| | | | | |
|---|---|---|---|---|
| 6,292,568 B1 * | 9/2001 | Akins et al. | .................. | 380/239 |
| 6,510,519 B2 * | 1/2003 | Wasilewski et al. | .......... | 713/168 |
| 6,550,011 B1 | 4/2003 | Sims, III | | |
| 6,560,340 B1 * | 5/2003 | Akins et al. | .................. | 380/239 |
| 6,880,081 B1 | 4/2005 | Itkis | | |
| 6,952,479 B2 | 10/2005 | Shavit et al. | | |
| 6,971,008 B2 * | 11/2005 | Wasilewski et al. | .......... | 713/168 |
| 7,124,303 B2 * | 10/2006 | Candelore et al. | ............ | 713/189 |
| 7,242,766 B1 * | 7/2007 | Lyle | .................. | 380/2 |
| 7,577,835 B2 * | 8/2009 | Anspach et al. | ............. | 713/160 |
| 2003/0001978 A1 * | 1/2003 | Smith et al. | .................... | 348/714 |
| 2003/0081776 A1 * | 5/2003 | Candelore | .................... | 380/200 |
| 2003/0108199 A1 * | 6/2003 | Pinder et al. | .................. | 380/200 |
| 2003/0131252 A1 | 7/2003 | Barton | | |
| 2003/0198351 A1 | 10/2003 | Foster et al. | | |
| 2003/0219127 A1 * | 11/2003 | Russ et al. | .................... | 380/239 |
| 2004/0006541 A1 | 1/2004 | Huddelston et al. | | |
| 2004/0025023 A1 | 2/2004 | Yamada et al. | | |
| 2004/0028386 A1 * | 2/2004 | Walls et al. | ...................... | 386/95 |
| 2004/0049688 A1 * | 3/2004 | Candelore et al. | ............ | 713/191 |
| 2004/0083177 A1 * | 4/2004 | Chen et al. | ....................... | 705/50 |
| 2004/0136532 A1 * | 7/2004 | Pinder et al. | .................. | 380/239 |
| 2005/0028193 A1 * | 2/2005 | Candelore et al. | ............. | 725/32 |
| 2005/0083970 A1 * | 4/2005 | Glickman et al. | ............ | 370/466 |
| 2005/0086501 A1 * | 4/2005 | Woo et al. | ..................... | 713/189 |
| 2005/0108746 A1 * | 5/2005 | Futagami et al. | ............... | 725/31 |
| 2005/0125357 A1 | 6/2005 | Saadat et al. | | |
| 2005/0135618 A1 * | 6/2005 | Aslam et al. | .................. | 380/212 |

(Continued)

OTHER PUBLICATIONS

"Analysis: The FCC Rules to Adopt the Broadcast Flag", Retrieved from the Internet on Nov. 30, 2005, http://digital-lifestyles.info/display_page.asp?section=business&Id=913.

(Continued)

*Primary Examiner* — Vivek Srivastava
*Assistant Examiner* — Michael D Anderson
(74) *Attorney, Agent, or Firm* — Lee & Hayes, PLLC

(57) ABSTRACT

A tuning device uses a counter mode encryption cipher to encrypt counters associated with media content in order to protect the media content when it is sent to requesting device or controller. The encrypted counters are decrypted in order to consume the media content. The controller may send particular direction to the tuning device as to how the media content, encrypted counters, and other associated data are sent to the controller.

20 Claims, 4 Drawing Sheets

U.S. PATENT DOCUMENTS

| | | | |
|---|---|---|---|
| 2005/0144468 A1* | 6/2005 | Northcutt et al. | 713/189 |
| 2005/0191033 A1 | 9/2005 | Ishido | |
| 2005/0204163 A1 | 9/2005 | Alkove et al. | |
| 2005/0210278 A1 | 9/2005 | Conklin et al. | |
| 2006/0039285 A1* | 2/2006 | Chapman et al. | 370/235 |
| 2006/0072458 A1* | 4/2006 | Dougall et al. | 370/230 |
| 2006/0126843 A1* | 6/2006 | Brickell et al. | 380/260 |
| 2006/0262931 A1* | 11/2006 | Nakano | 380/270 |
| 2006/0288209 A1* | 12/2006 | Vogler | 713/168 |
| 2007/0143854 A1* | 6/2007 | Wasilewski | 726/26 |
| 2007/0271470 A9* | 11/2007 | Candelore et al. | 713/191 |
| 2007/0276756 A1* | 11/2007 | Terao et al. | 705/51 |
| 2008/0065907 A1* | 3/2008 | Nutter et al. | 713/193 |
| 2008/0069350 A1* | 3/2008 | Reinoso et al. | 380/200 |
| 2008/0312922 A1* | 12/2008 | Evenden et al. | 704/246 |
| 2009/0028160 A1* | 1/2009 | Eswaran et al. | 370/395.32 |
| 2009/0123131 A1* | 5/2009 | Morioka | 386/124 |
| 2009/0172390 A1* | 7/2009 | Milliken | 713/153 |
| 2009/0288125 A1* | 11/2009 | Morioka | 725/110 |

OTHER PUBLICATIONS

"Content Protection", Retrieved from the Internet on Nov. 30, 2005: http://www.pctechguide.com/10dvd_Content_protection.htm.

"Intel and DTCP", Retrieved from the internet on Nov. 30, 2005: http://www.intel.com/standards/case/case_dtcp.htm.

* cited by examiner

ENCRYPTING CONTENT IN A TUNER DEVICE AND ANALYZING CONTENT PROTECTION POLICY

BACKGROUND

Media content may include audio, video, and data content, such as different types of audio and video programming. Media content may broadcast or originate from various sources and distributed through various mediums such as cable, satellite, radio frequency (RF), Ethernet, etc.

Content owners, broadcasters, regulatory bodies, and government agencies may have requirements in how media content and particularly premium media content, is to be protected after it is received, decrypted, and passed on for consumption. For example, there may be restrictions imposed on how media content may be recorded, distributed, and/or copied.

Media content may be encrypted by the originator or broadcaster prior to being distributed. The encryption is particular to the originator or broadcaster, and may be implemented using specific methods (i.e., algorithms). A tuner device such as a set top box or smart card that receives the encrypted media content is particularly equipped with the ability to decode or decrypt the encrypted media content. The decrypted media content may include specific command and control information such as policy or policies which include attributes associated with the media content. Typical policy includes rights to copy or record the media content, how the media content may be rendered or displayed, and the type of equipment that may display the TV content (i.e., analog receiver or digital receiver).

The decrypted media content, along with command and control information (i.e., policy) may be sent to a controller such as a personal computer or server computer, where consumption (e.g., rendering and recording) of the media content is performed through one or more software applications resident on the controller. However, to protect the decrypted media content from illicit use and/or distribution to other devices, it is desirable to protect the decrypted media content prior to delivery to the controller.

In order for the controller to receive media content, and particularly protected media content, the controller and applications running in the controller need to meet compliance and robustness rules set forth in various content protection specifications imposed by content owners, broadcasters, regulatory bodies, government agencies and other parties as discussed above.

For example, when audio and visual content (i.e., media content) are received and decrypted by a tuner device, the decrypted content from the tuner device is to be protected when sent to a recording application in a controller or personal computer. In other words, media content from the tuner device to the controller should be protected in some manner, such as re-encryption, such that the media content cannot be consumed (e.g., played or recorded) by an unauthorized device or applications running on said device. Protection may be performed at the tuner device; however, computational resources at the tuner device may not be adequate to determine the policies for the content. The controller or personal computer may perform the protection. Furthermore, the ability should also be provided for the controller to instruct the tuner device as to delivery of the media content.

Therefore, there is a need to protect media content that is communicated from a tuner device to a controller, without undue burden on the resources of the tuner device and the controller.

SUMMARY

Media content, such as audio, video, and data content are requested to be sent to a device for consumption. The media content is protected by encryption, where the counter is decrypted at the receiving device (i.e., rendering device or component in the receiving device) in order for the media content to be consumed. The receiving device may further provide direction as to how the media content is sent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
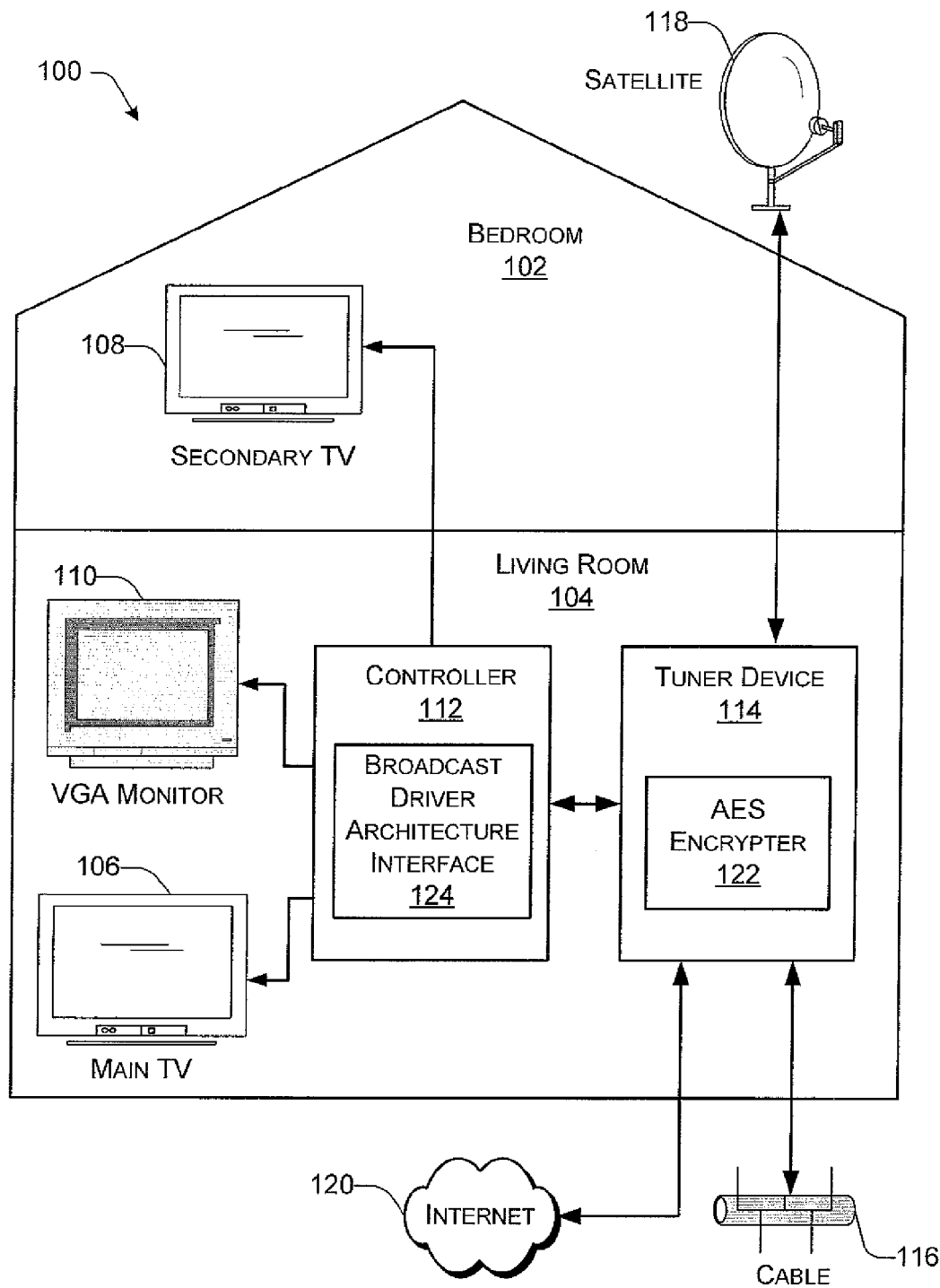
FIG. 1 is an illustration of an exemplary environment that includes a tuner device that encrypts media content using counter mode encryption, and a controller that decrypts and consumes the media content.

FIG. 1 shows an exemplary environment 100 including a bedroom 102 and a living room 104. Situated throughout the environment 100 are multiple monitors, such as a main TV 106, a secondary TV 108, and a monitor 110 (e.g., a VGA monitor, a digital computer monitor such as a DVI or HDMI style monitor). Media content, such as video, audio, and data content may be supplied from an entertainment server or a controller 112 situated in the living room 104 over a home network either directly or indirectly routed through a thin client device (e.g. Media Center Extender) to each of the monitors 106, 108, 110. In one implementation, the controller 112 is a conventional personal computer (PC) configured to run a multimedia software package such as Windows® XP Media Center™ edition operating system marketed by the Microsoft Corporation. In such a configuration, the controller 112 is able to integrate full computing functionality with a complete home entertainment system into a single PC (e.g., controller 112). For instance, a user can watch TV in one graphical window of one of the monitors 106, 108, 110 while sending email or working on a spreadsheet in another graphical window on the same monitor. In addition, the controller 112 may also include other features, such as: a personal video recorder (PVR) to capture live broadcast shows for future viewing or to record the future broadcast of a single program or series; DVD playback; an integrated view of the user's recorded content, such as TV shows, movies, songs, pictures, and home videos; and a EPG (Electronic Program Guide). In addition to being a conventional PC, the controller 112 could also comprise a variety of other devices capable of rendering media content including, for example, a notebook or portable computer, a tablet PC, a workstation, a mainframe computer, a server, an Internet appliance, combinations thereof, and so on.

In certain applications, controller 112 may include a smart card or set top box; however, in this example, a tuner device 114 is shown as a separate device which incorporates the functions of a smart card or set top box capable of delivering media content (i.e., audio, video, and data content) to the controller 112. Through the tuner device 114 and controller 112, a user can watch and control a stream of media content received, for example, via cable 116, satellite 118, an antenna (not shown for the sake of graphic clarity), and/or a network such as the Internet 120.

The controller 112 may also enable multi-channel output for speakers (not shown for the sake of graphic clarity). This may be accomplished through the use of digital interconnect outputs, such as Sony-Philips Digital Interface Format (SP-DIF) or Toslink enabling the delivery of Dolby Digital, Digital theater Sound (DTS), or Pulse Code Modulation (PCM) surround decoding.

Tuner device 114 includes an Advanced Encryption Standard (AES) encrypter 122. AES is well known in the art, and has been chosen as an encryption cipher by agencies such as the National Institute of Standards and Technology. AES is a block cipher that can be used in many modes; however, in this particular example, AES counter mode is particularly used by the AES encrypter 122. In general, AES counter mode uses an arbitrary number (i.e., word) or counter that changes with each data packet (i.e., media content in a data packet) associated with the counter. The counter is encrypted with an AES cipher, and the result is XOR'ed into cipher text. Since the counter changes for each block of text or data packet, a problem of repeating encrypted content is avoided.

AES encrypter 122 may be controlled by an application such as Microsoft® Windows® Media digital rights management (WMDRM) for authorized playback, capture, and/or interactive media center applications resident at the controller 112. In particular, for certain applications, broadcast driver architecture (BDA) interface 124 is used to transfer audio and visual content from the tuner device 114 to a recording application in the controller 112 in digital form. In specific, BDA interface 124 is provided in controller 112 to decrypt protected media content passed from the AES encrypter 122 of tuner device 114. The BDA interface 124 is provided with the necessary AES decryption algorithms, including necessary decryption keys, to decrypt the protected media content passed from AES encrypter 122. Through the use of the AES encrypter 122 and the BDA interface 124, media content is protected and resources at the tuner device 114 and controller 112 are effectively utilized. Furthermore as further discussed below, the BDA interface 124 allows the controller 112 to direct the tuner device 114 to provide protected media content and to define how media content and data associated with the media content is sent (e.g., streams and sub-streams).

Figure 2:
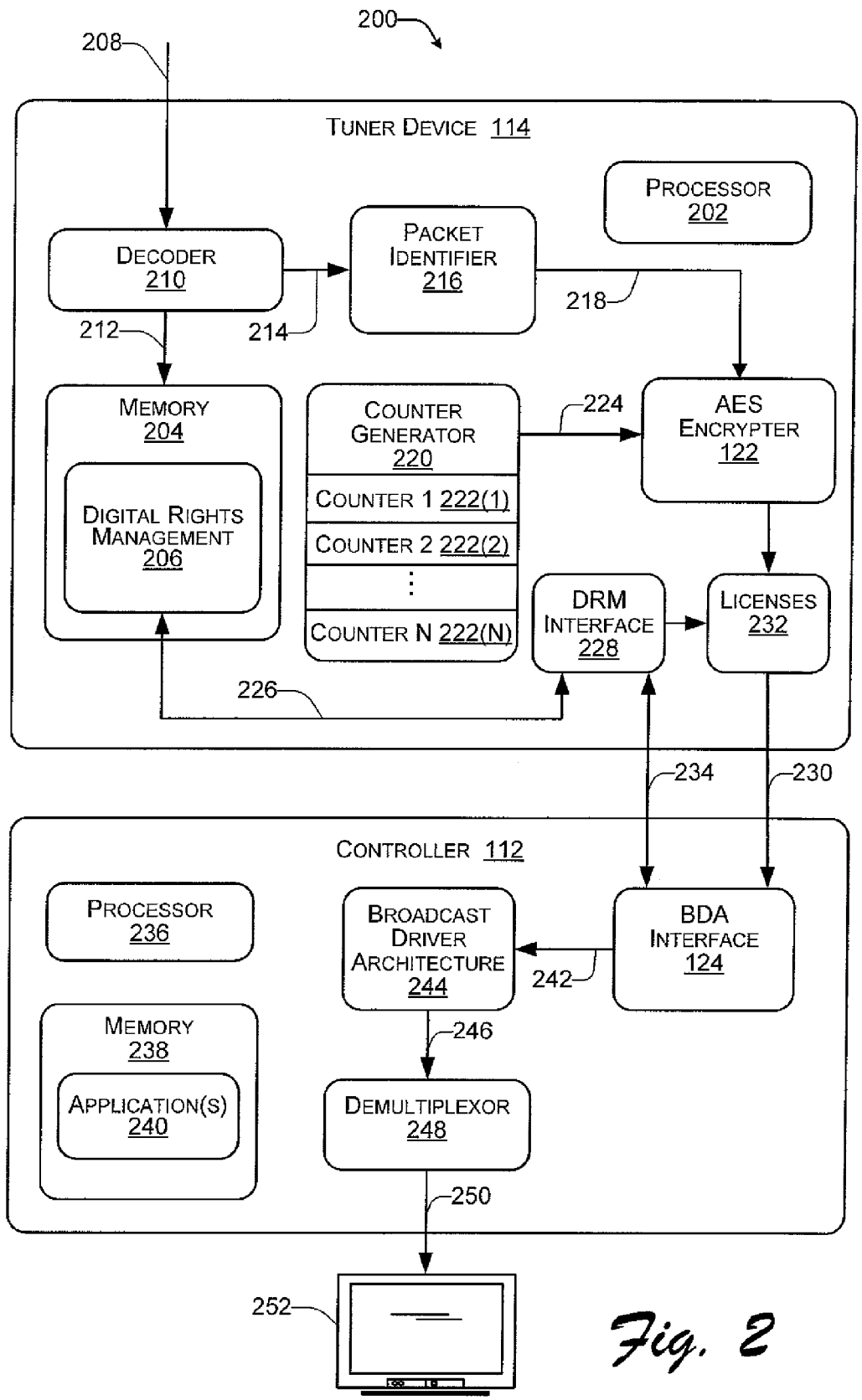
FIG. 2 is a block diagram illustrating a tuner device that encrypts media content using counter mode encryption to a controller that consumes the media content.

FIG. 2 shows an exemplary tuner device 114 and controller 112 as part of a system 200. The system 200 may be included in environment 100 of FIG. 1. Tuner device 114 may include a processor 202 and memory 204. Memory 204 may include one or more application programs or applications. In this example, memory 204 includes a digital rights management (DRM) application 206, such as Windows® media DRM, used to provide control and command data of media content from tuner device 114 to controller 112. Furthermore, through DRM application 206, the controller 112 is able to direct the tuner device 114 to provide media content and data associated with the media content, such as licenses and keys, in a particular manner.

Media content 208 is received by tuner device 114. The media content 208 may be received in the form of packets that make up streaming media. In particular, the packets may be defined by the MPEG 2 standard that provides that packets are 188 bytes long, wherein the first four bytes of the packet (i.e., the packet header) define a packet identifier or PID. The PID of a packet may indirectly identify whether a packet is audio data, video data, or command and control data. In other words, there may be a table or tables that are referred which provides information as to PID values containing audio and/or video.

A decoder 210 receives and decrypts the media content 208. The decoder 210 is particularly configured to decrypt the media content 208 based on the specific method or algorithm in which the media content 208 is encrypted by the content owner, broadcaster, originator, or other party.

Command and control information (i.e., policy) or data 212 may be passed on to DRM application 206. Furthermore, the data 212 may include licenses and keys associated with media content. The DRM application 206 passes information (i.e., policies, licenses, and keys) to controller 112, where such information is used in consuming the media content. Controller 112 may also provide feedback or data to the DRM application 206. For example, such data may include request for media content, encryption of media content, and the restriction of streams of media content sent to the controller 112.

Decrypted and unprotected media content in the form of packets of a transport stream 214 are sent to a packet identifier 216. Packet identifier 216 looks at the first four bytes of each packet (i.e., packet header), to determine if the packet is to be filtered and eventually sent to the controller 112. In certain cases, a packet may be identified by the packet identifier 216 to be dropped and not sent to the controller 112. The controller 112 may provide a command to the DRM application 206 to drop or not send particular packets. Commands may be filtered by the DRM application 206 through a BDA block. For example, the DRM application 206 may be used to protect some of the commands to the BDA block. In particular, the controller 112 can send to the tuner device 114 a command to not-encrypt certain PIDs. Such a command goes through the DRM application 206 to ensure that it's authorized. Packet identifier 216 further identifies through the headers, if the packets are part of a media stream that is made of discrete media content packets that are communicated in a particular order or sequence, or if the packets are "bulk" and have no particularly sequence. Packets or data 218 from the packet identifier 216 may include a transport stream of sequenced media content, along with a separate stream or transmission of bulk packets. As discussed below, discrete packets of sequence media content are given unique counter values, while bulk packets are given the same counter value and transmitted to AES encrypter. Bulk packets may be particularly identified and streamed (i.e., sent) as a group.

A counter generator 220 provides distinct counter values identified as counters 222. Individual counters are sent as a specific counter value 224 to AES encrypter 122 which associates the particular counters 222 with particular packets. As discussed above, AES counter mode provides that the AES encrypter 122 encrypts the counter or counter value 222 which in used to encrypt the media content. Bulk packets may use the same counter value 222, while sequenced media content packets are associated with unique encrypted counters.

The DRM application 206 may communicate command and control (i.e., policies), keys, and licenses represented as data inline or as data in a separate stream, associated with media content to controller 112. In this example, a particular DRM interface 228 is provided that communicates with controller 112. Media content and encrypted counters (i.e., cipher text) may be sent as a separate stream 230 from AES encrypter 122. Furthermore, licenses 232 which may contain encrypted key values and policies may be sent over stream 230. Command and control passed on from DRM application 206 through DRM interface 228 is represented as data line 234. Data line 234 is shown as a two way communication line that allows controller 112 to send instructions (i.e., commands and requests) to DRM application 206. Stream 230 and data line 234 may use a particular communication wired or wireless interface. Examples of communication interfaces include Ethernet, universal serial bus (USB) and FireWire (IEEE 1394).

Exemplary controller 112 includes a central processing unit or processor 236, and a memory 238. Memory 238 includes an application or applications 240 which are particularly used to consume media content, such as rendering, copying, and/or recording media content.

In this example, BDA interface 124 is included in controller 112, and receives and sends information on data line 234. Furthermore, BDA interface 124 receives media content and AES encrypted counters through transport stream 230. The BDA interface 124 particularly passes decrypted media content on to a broadcast driver architecture (BDA) 244 that supports applications 238. Media content processed by the BDA 244 is sent as audio and video streams to a demultiplexor 248 for rendering (i.e., display) as audio video data (i.e., streaming media) 250 through a monitor or display 252 which includes monitors 106, 108, and 110 of FIG. 1.

Figure 3:
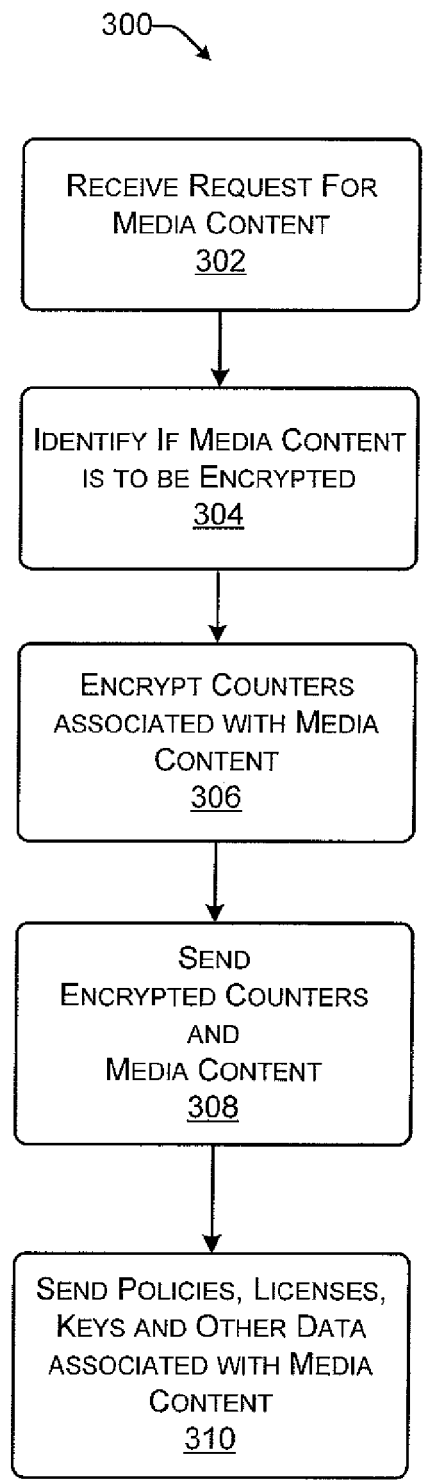
FIG. 3 is a flow diagram illustrating a process that provides for trusted communication between a tuner device and controller, and provides the controller with encrypted media content and protection policy.

FIG. 3 shows a process 300 that provides for trusted communication between a tuner device and controller. In particular, the trusted communication is used to provide encrypted media content and protection policy to the controller. The process 300 is illustrated as a collection of blocks in a logical flow graph, which represent a sequence of operations that can be implemented in hardware, software, firmware, or a combination thereof In the context of software, the blocks represent computer instructions that, when executed by one or more processors, perform the recited operations. Although described as a flowchart, it is contemplated that certain processes may take place concurrently or in a different order. The process may be implemented, for example, by the tuner device 114 as discussed in FIG. 1 and FIG. 2, although the process 300 may be implemented by other architectures.

At block 302, a request for media content is received. Media content can include audio, video, and data content. The request may be from a requesting device such as personal computer or controller (e.g. controller 112 of FIG. 1 and FIG. 2). In particular, the request may originate from an application or applications resident on the controller, and be received by an application in a tuner device such as DRM application 206 described above. The request, and other communication between the controller and tuner device, may be through a dedicated interface such as DRM interface 228 described above. The request may result in establishing trust such that media content can be sent to the requesting device.

At block 304, a determination is made whether the media content is to be encrypted or protected prior to being sent to the controller. The request at block 302 may include a command or direction to not encrypt or protect selective media content. For example, a transport stream may contain many sub-streams, and the controller may indicate which sub-streams do not need to be protected. There may also be subdata within a sub-stream that the controller might indicate to the tuner device that does not need to be protected. Furthermore, there may be receiving direction from the requesting device or controller as to whether data, including the media content, is to be protected and sent to the requesting device. Encrypted or protected media content may be identified through packet header information contained in packets that contain the media content. Media content that is identified as unprotected may be merely passed on or sent to the controller without encryption of an associated counter. A trust or a determination may be established with the controller, that the media content may be sent to the controller. Furthermore, the request may be initiated by an application resident on the controller or requesting device.

At block 306, particular counters are generated and assigned to packets that contain media content. The particular counters are encrypted using an algorithm or cipher such as Advanced Encryption Standard (AES). In particular, counter mode as provided by AES is used. Each particular counter that is assigned or associated with a media content packet is needed with the packet in order to decrypt and consume the media content. Along with packets that contain audio, video, and data content, packets or data that contain policies, keys, licenses, and other information related to media content may be encrypted in a similar manner. Furthermore, a group of packets may be associated with a particular counter (i.e., encrypted as a group, where such packets may be referred to as bulk packets). In addition, the encryption provides for protection of media content that previously was not protected. In other words, media content may be received as encrypted content by the tuner device; however, there may be media content or information that is received and is not encrypted. Regardless, of the prior encryption status, the media content and/or information may be encrypted at block 306.

At block 308, media content and associated encrypted counters are sent from the tuner device. The media content are particularly sent as data packets, where the data packets may be part of a streaming or sequenced transport stream. The media content and encrypted packets may be sent in a data stream or sub-stream separate from other communication from the tuner device. The requesting device may assign a specific counter to selective sub-streams; and the requesting device can assign a shared counter to other sub-streams.

At block 310, policies, licenses, keys, and other data are sent from the tuner device. The policies, licenses, keys, and other data are associated with actual media content and may be used in consumption of the media content. For example, keys may used in decryption, and licenses may be used to determine rights associated with the controller in consuming (e.g., playing and copying) the media content.

Figure 4:
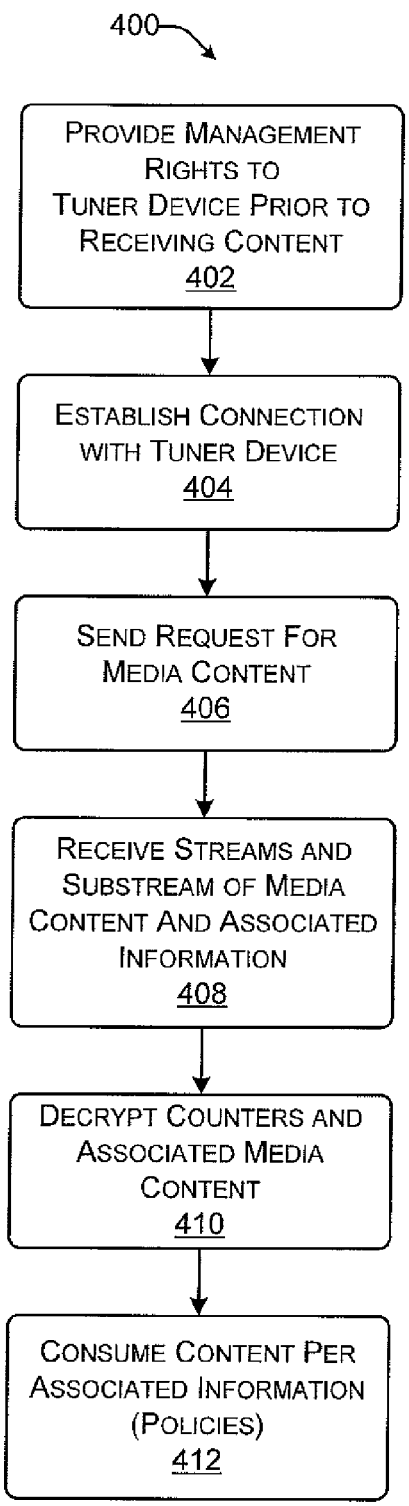
FIG. 4 is a flow diagram illustrating a process for requesting, receiving, and consuming encrypted media content.

FIG. 4 shows a process 400 that receives and consumes encrypted media content and associated information. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order. The process may be implemented, for example, by the controller 112 as discussed in FIG. 1 and FIG. 2, although the process may be implemented by other architectures.

At block 402, management rights (e.g., DRM) are provided to a tuner device, or a tuner device determines the management rights at the controller, prior to release of content from the tuner device. Furthermore, a connection determination between the tuner device and controller may be determined.

For example, the connection may be through wired or wireless standard and/or interface, such as universal serial bus (USB), IEEE 1394 (FireWire), or Ethernet.

At block 404, a connection is established with the tuner device. The connection is based on specific standards or interfaces as determined at block 402. Furthermore, separate transport streams or sub-streams may be provided for sequenced media content, command and control information, and other data.

At block 406, a request is sent for media content. The request may originate from an application or applications that consumes (e.g., plays, records, copies, etc.) the media content. The request may go through a broadcast driver architecture (BDA) and a BDA interface, and communicated to an application in the tuner device such as DRM application 206 of FIG. 2.

In certain cases, an authenticated message may be sent to receive selective media content or sub-streams (i.e., sub-streams that include content) unencrypted. In particular cases, a selective data pattern may be configured to be detected before encryption of the media content. For certain cases, the last byte of the data pattern header is sent in the clear; and a number of bytes may be configured to be to left in the clear after the data pattern header. Furthermore, the requesting device may configure selective data may be discarded; and in place of the discarded data a marker may be supplied indicating the amount of discarded data At block 408, media content, along with the AES counters associated with the media content, are received. The media content and the encrypted keys may be received either in a separate transport stream or sub-stream as when the connection is established in block 404, or in the same stream or sub-stream as the media content. In addition, policies, keys, and licenses associated with the media content may be sent either in separate from the transport stream or sub-stream of the media content, or in the same stream or sub-stream as the media content. In addition, a token may be included in the media content stream, where all configuration changes prior to receiving the token have been applied. Furthermore, new encryption keys may be generated for the same policy or license.

At block 410, encrypted media content that is to be consumed is decrypted. In certain cases, encrypted, or signed, data may be associated with information other than media content such as policies and keys. Encrypted data for such information are decrypted such that the information (e.g., keys and licenses) may be used, either to directly or indirectly support received media content. The decryption may be performed by BDA interface 124 described in FIG. 1 and FIG. 2.

At block 412, the media content is consumed. In particular, an authorized application or applications using information such as policies, licenses, and keys are used to play, copy, and/or record the received media content. For example, the media content may be recorded to a memory, or played on a monitor or monitors.

CONCLUSION

The above-described methods and devices describe providing protected media content to a controller, and allowing the controller to provide direction as to how the media content is provided. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed at a tuner device by a processor executing instructions stored in a memory, the method comprising:
   receiving a request at the tuner device as an authenticated message from a requesting device for delivery of media content;
   receiving media content corresponding to the requested media content at the tuner device, the media content comprising a plurality of packets;
   passing the plurality of packets to a packet identifier for separating the packets into at least a first stream of sequenced media content packets that are part of a sequenced media stream communicated in a particular sequence, and a second stream of bulk packets containing information related to the media content and not having a particular sequence;
   encrypting the first stream of sequenced media content packets using first counters, by using a unique first counter to encrypt each discrete sequenced media content packet;
   encrypting the second stream of bulk packets containing information related to the media content as a group using a second counter, different from the first counters, as a second shared counter;
   sending the media content from the tuner device to the requesting device using at least two streams comprising:
      sending the first stream of the sequenced media content packets that are communicated in the particular sequence, each sequenced media content packet in the first stream having been encrypted with a corresponding unique first counter; and
      sending the second stream comprising the bulk packets encrypted as a group using the second shared counter.

2. The method of claim 1, the receiving the request from the requesting device further comprising:
   receiving the request by a digital rights management application implemented on the tuner device, the receiving being performed through a two-way interface on the tuner device for communication with the requesting device, the request indicating that certain media content of the media content is to be sent unencrypted as not requiring protection; and
   passing the request that the certain media content be sent unencrypted through the digital rights management application to authorize the request.

3. The method of claim 1 wherein the request for media content received by the tuner device is initiated by an application resident on the requesting device.

4. The method of claim 1 further comprising requesting by the requesting device that the tuner device discard specified data and in place of the discarded data supply a marker to the requesting device indicating an amount of discarded data.

5. The method of claim 1 further comprising providing data describing the media content, including control information for the media content from the digital rights management application, through a separate stream to the requesting device.

6. The method of claim 1, wherein:
   the request includes a command that specifies that certain media content of the media content is to be sent unencrypted by specifying certain packet identifiers used for identifying the certain media content to be sent unencrypted; and the certain media content requested to be sent in unencrypted form is sent in a third stream separate from the first stream and the second stream.

7. A computing device comprising:
a processor;
a memory in communication with the processor;
a driver implemented by the processor that provides, to a tuner device, management rights of the computing device as to certain media content;
the driver implemented to request encrypted media content to be sent from the tuner device to the computing device, a request sent by the driver comprising an assignment of counters to separate transport streams comprising a first transport stream for sequenced media content packets encrypted individually and a second transport stream for bulk packets having information related to the sequenced media content packets, the sequenced media packets having unique first counters assigned, such that a unique first counter is used to encrypt each discrete sequenced media content packet, the second transport stream for bulk packets having a shared counter assigned, the shared counter being used to encrypt the bulk packets as a group; and
the driver further implemented to receive the encrypted media content at the computing device through the separate transport streams.

8. The computing device of claim 7, wherein the request is initiated by a resident application on the computing device.

9. The computing device of claim 7, further comprising the driver being implemented to receive the encrypted media content comprising additional data associated with the media content, the additional data comprising at least one of the following: policies, keys, and licenses associated with the media content.

10. The computing device of claim 7, further comprising the driver being implemented to issue an authenticated message from the computing device to the tuner device, the authenticated message instructing the tuner device to deliver one or more selective sub-streams unencrypted to the computing device based on one or more packet identifiers of packets of the media content.

11. The computing device of claim 7, further comprising the driver being implemented to configure a selective data pattern header detected before encryption.

12. The computing device of claim 11, at least a last byte of the data pattern header being sent in the clear, a number of bytes being left in the clear after the data pattern header.

13. The computing device of claim 7 wherein the computing device instructs the tuner device to discard specified data and in place of the discarded data supply a marker to the computing device indicating an amount of the discarded data.

14. The computing device of claim 9 further comprising a display device in communication with the computing device, wherein:
the driver implemented on the computing device receives the encrypted media
the driver implemented on the computing device decrypts the encrypted content using the counters, and
the driver implemented on the computing device uses the additional data received from the tuner device to determine whether to permit the media content to be displayed on the display device.

15. The computing device of claim 9 further comprising a recording application implemented on the computing device by the processor, wherein:
the driver implemented on the computing device receives the encrypted content and encrypted counters,
the driver implemented on the computing device decrypts the encrypted content using the counters, and
the driver implemented on the computing device uses the additional data received from the tuner device to determine whether to permit the recording application to record the decrypted content to the memory on the computing device.

16. A tuner device comprising:
a processor;
a packet identifier, controlled by the processor, the packet identifier identifying packets of a received transport stream to separate identified packets into at least a first stream of sequenced media content packets that are part of a sequenced media stream communicated in a particular sequence, and a second stream of bulk packets that include information related to the sequenced media content packets and that do not have a particular sequence;
a counter generator, controlled by the processor, the counter generator providing distinct counters for use in encrypting the identified packets; and
an encrypter, controlled by the processor, that encrypts the identified packets, wherein:
the first stream of sequenced media content packets that are communicated in the particular sequence are each encrypted with a unique counter, and
the second stream of bulk packets that include information related to the sequenced media content packets are encrypted and streamed as a group using a shared counter.

17. The tuner device of claim 16, the packet identifier further identifying certain packets that are specified by a computing device to be dropped.

18. The tuner device of claim 16, the bulk packets containing information related to the sequenced media content packets that comprises at least one of policies, keys or licenses.

19. The tuner device of claim 16, wherein the encrypter employs Advanced Encryption Standard for using the counters to encrypt the packets.

20. The tuner device of claim 16, further comprising:
an interface for communication with a computing device, the interface receiving instructions from the computing device for specifying which counters are associated with the identified packets; and
a digital rights management application resident on the memory for communicating with the computing device for establishing a trusted relation with the computing device.

* * * * *

UNITED STATES PATENT AND TRADEMARK OFFICE
CERTIFICATE OF CORRECTION

PATENT NO. : 8,139,768 B2  Page 1 of 1
APPLICATION NO. : 11/275626
DATED : March 20, 2012
INVENTOR(S) : Pritchett et al.

It is certified that error appears in the above-identified patent and that said Letters Patent is hereby corrected as shown below:

In column 9, lines 57, in Claim 14, after "media" insert -- content and the encrypted counters, --.

Signed and Sealed this
Ninth Day of October, 2012

David J. Kappos
*Director of the United States Patent and Trademark Office*